(12) United States Patent
Cooksey et al.

(10) Patent No.: US 11,483,970 B2
(45) Date of Patent: Nov. 1, 2022

(54) SYSTEM AND METHOD FOR ADJUSTING THE ORIENTATION OF AN AGRICULTURAL HARVESTING IMPLEMENT BASED ON IMPLEMENT HEIGHT

(71) Applicant: CNH Industrial America LLC, New Holland, PA (US)

(72) Inventors: William Lee Cooksey, Geneseo, IL (US); Nicholas S. Shane, Bennett, IA (US)

(73) Assignee: CNH Industrial America LLC, New Holland, PA (US)

( * ) Notice: Subject to any disclaimer, the term of this patent is extended or adjusted under 35 U.S.C. 154(b) by 568 days.

(21) Appl. No.: 16/202,811

(22) Filed: Nov. 28, 2018

(65) Prior Publication Data

US 2020/0163277 A1 May 28, 2020

(51) Int. Cl.
*A01D 41/127* (2006.01)
*A01D 41/06* (2006.01)
*A01D 41/14* (2006.01)

(52) U.S. Cl.
CPC ........... *A01D 41/127* (2013.01); *A01D 41/06* (2013.01); *A01D 41/141* (2013.01)

(58) Field of Classification Search
CPC combination set(s) only.
See application file for complete search history.

(56) References Cited

U.S. PATENT DOCUMENTS

| 4,171,606 A | 10/1979 | Ziegler et al. |
| 4,409,778 A | 10/1983 | McNaught |
| 5,927,054 A | 7/1999 | Chamberlain |

(Continued)

FOREIGN PATENT DOCUMENTS

| CN | 106386758 A | * | 2/2017 |
| CN | 106358579 B | * | 8/2018 |

(Continued)

OTHER PUBLICATIONS

International Search Report and Written Opinion for PCT/US2019/063684, dated Mar. 10, 2020 (13 pages).

*Primary Examiner* — Redhwan K Mawari
(74) *Attorney, Agent, or Firm* — Peter Zacharias; Patrick Sheldrake

(57) ABSTRACT

In one aspect, a system for adjusting harvesting implement orientation of an agricultural harvester may include a harvesting implement configured to be coupled to the agricultural harvester in a manner that permits a fore/aft tilt angle defined between a longitudinal axis of the harvesting implement and a field surface to be adjusted. The system may also include a sensor configured to detect a parameter indicative of a distance between the harvesting implement and the field surface. Furthermore, the system may include a controller configured to receive an input associated with a predetermined characteristic of the harvesting implement. The controller may also be configured to monitor the distance between the harvesting implement and the field surface based on data received from the sensor and initiate adjustments of the fore/aft tilt angle based on the received input and the monitored distance.

16 Claims, 4 Drawing Sheets

(56) References Cited

U.S. PATENT DOCUMENTS

| | | | | |
|---|---|---|---|---|
| 5,935,183 | A * | 8/1999 | Sahm | G01C 15/002 |
| | | | | 701/50 |
| 6,164,415 | A * | 12/2000 | Takeuchi | B66F 9/22 |
| | | | | 187/223 |
| 6,813,873 | B2 | 11/2004 | Allworden et al. | |
| 8,621,855 | B2 * | 1/2014 | Meyeres | E02F 9/2004 |
| | | | | 60/484 |
| 8,826,635 | B2 | 9/2014 | Schraeder | |
| 8,966,871 | B2 | 3/2015 | Nafziger et al. | |
| 9,769,982 | B2 * | 9/2017 | Figgins | A01D 41/141 |
| 9,807,926 | B2 | 11/2017 | Wilken et al. | |
| 9,826,673 | B1 * | 11/2017 | Ray | A01B 79/005 |
| 10,150,483 | B2 * | 12/2018 | Procuniar | H04L 41/0853 |
| 10,315,663 | B2 * | 6/2019 | Dudar | B60H 1/00764 |
| 2006/0178787 | A1 * | 8/2006 | McCall | B60R 1/002 |
| | | | | 701/1 |
| 2007/0163220 | A1 * | 7/2007 | Ehrhart | A01D 41/145 |
| | | | | 56/10.2 E |
| 2008/0000660 | A1 * | 1/2008 | Moe | E02F 3/7672 |
| | | | | 172/799.5 |
| 2010/0077712 | A1 * | 4/2010 | Nathan | A01D 41/141 |
| | | | | 56/208 |
| 2010/0270044 | A1 * | 10/2010 | Johnson | E02F 3/3414 |
| | | | | 404/83 |
| 2010/0287900 | A1 * | 11/2010 | Ringwald | A01D 41/141 |
| | | | | 56/28 |
| 2013/0108403 | A1 * | 5/2013 | Atkinson | E02F 9/265 |
| | | | | 701/50 |
| 2013/0144470 | A1 * | 6/2013 | Ricci | G06Q 40/08 |
| | | | | 701/2 |
| 2013/0283745 | A1 * | 10/2013 | Brendon | A01D 41/141 |
| | | | | 56/10.2 A |
| 2013/0298515 | A1 * | 11/2013 | Lohrentz | A01D 41/16 |
| | | | | 56/51 |
| 2014/0000919 | A1 * | 1/2014 | Bachman | A01B 63/24 |
| | | | | 172/4 |
| 2014/0041352 | A1 | 2/2014 | Johnson | |
| 2014/0257732 | A1 * | 9/2014 | Kingdon | E02F 9/264 |
| | | | | 702/94 |
| 2015/0271999 | A1 | 10/2015 | Enns et al. | |
| 2015/0342110 | A1 * | 12/2015 | Peake | A01B 79/005 |
| | | | | 701/50 |
| 2016/0029559 | A1 * | 2/2016 | Inoue | A01D 41/1208 |
| | | | | 56/10.2 J |
| 2017/0006758 | A1 * | 1/2017 | Dienst | A01C 7/208 |
| 2017/0008475 | A1 * | 1/2017 | Kruse | B60R 21/203 |
| 2017/0013777 | A1 * | 1/2017 | Posselius | A01D 41/141 |
| 2017/0064904 | A1 * | 3/2017 | Figgins | A01D 34/006 |
| 2017/0113548 | A1 * | 4/2017 | Lucas | G06F 3/0481 |
| 2017/0311541 | A1 * | 11/2017 | Pankaj | A01D 34/04 |
| 2018/0002901 | A1 * | 1/2018 | Shimano | E02F 9/262 |
| 2020/0019159 | A1 * | 1/2020 | Kocer | G05D 1/0219 |
| 2020/0163277 | A1 * | 5/2020 | Cooksey | A01D 41/06 |

FOREIGN PATENT DOCUMENTS

| | | | | |
|---|---|---|---|---|
| CN | 108684303 A | * | 10/2018 | |
| DE | 102015102881 A1 | * | 9/2016 | A01B 63/00 |
| EP | 2712493 | | 4/2014 | |
| EP | 3025575 A1 | | 6/2016 | |
| JP | 2011217673 A | * | 11/2011 | |
| WO | 2018152266 A1 | | 8/2018 | |
| WO | 2012142555 A1 | | 10/2018 | |

* cited by examiner

SYSTEM AND METHOD FOR ADJUSTING THE ORIENTATION OF AN AGRICULTURAL HARVESTING IMPLEMENT BASED ON IMPLEMENT HEIGHT

FIELD OF THE INVENTION

The present disclosure generally relates to agricultural harvesters and, more particularly, to systems and methods for adjusting the orientation of a harvesting implement of an agricultural harvester based on the height of the harvesting implement relative to a field surface.

BACKGROUND OF THE INVENTION

A harvester is an agricultural machine used to harvest and process crops. For instance, a forage harvester may be used to cut and comminute silage crops, such as grass and corn. Similarly, a combine harvester may be used to harvest grain crops, such as wheat, oats, lye, barely, corn, soybeans, and flax or linseed. In general, the objective is to complete several processes, which traditionally were distinct, in one pass of the machine over a particular part of the field. In this regard, most harvesters are equipped with a detachable harvesting implement, such as a header, which cuts and collects the crop from the field and feeds it to the base harvester for further processing.

The operator of the harvester typically adjusts the height of the header throughout the performance of a harvesting operation as the conditions of the field change. For example, the operator may lower the header when harvesting down or fallen crops and raise the header when harvesting standing crops. When changing the height of the header, the operator must typically adjust the fore/aft tilt angle of the header to optimize the efficiency of the harvesting operation. However, the optimal header fore/aft tilt angle varies not only based on header height, but also based the manufacturer, model, and/or type of the header. As such, it is generally difficult for the operator to accurately adjust the fore/aft tilt angle of the header, particularly when the operator already typically monitors and adjusts various other operating parameters of the harvester (e.g., the direction, speed, amount of harvested crop stored onboard, etc.).

Accordingly, an improved system and method for adjusting the orientation of a harvesting implement of an agricultural harvester would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for adjusting the harvesting implement orientation of an agricultural harvester. The system may include a harvesting implement defining a longitudinal axis extending between a forward end of the harvesting implement and an aft end of the harvesting implement. The harvesting implement may be configured to be coupled to the agricultural harvester in a manner that permits a fore/aft tilt angle defined between the longitudinal axis of the harvesting implement and a field surface to be adjusted. The system may also include a sensor configured to detect a parameter indicative of a distance between the harvesting implement and the field surface. Furthermore, the system may include a controller communicatively coupled to the sensor. The controller may be configured to receive an input associated with a predetermined characteristic of the harvesting implement. The controller may also be configured to monitor the distance between the harvesting implement and the field surface based on data received from the sensor. Furthermore, the controller may be configured to initiate adjustments of the fore/aft tilt angle based on the received input and the monitored distance.

In another aspect, the present subject matter is directed to a method for adjusting an orientation of a harvesting implement of an agricultural harvester. The harvesting implement may define a longitudinal axis extending between a forward end of the harvesting implement and an aft end of the harvesting implement. As such, the harvesting implement may be configured to be coupled to the agricultural harvester in a manner that permits a fore/aft tilt angle defined between the longitudinal axis of the harvesting implement and a field surface to be adjusted. The method may include receiving, with a computing device, an input associated with a predetermined characteristic of the harvesting implement. The method may also include monitoring, with the computing device, a distance between the harvesting implement and the field surface. Additionally, the method may include initiating, with the computing device, adjustments of the fore/aft tilt angle based on the received input and the monitored distance.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
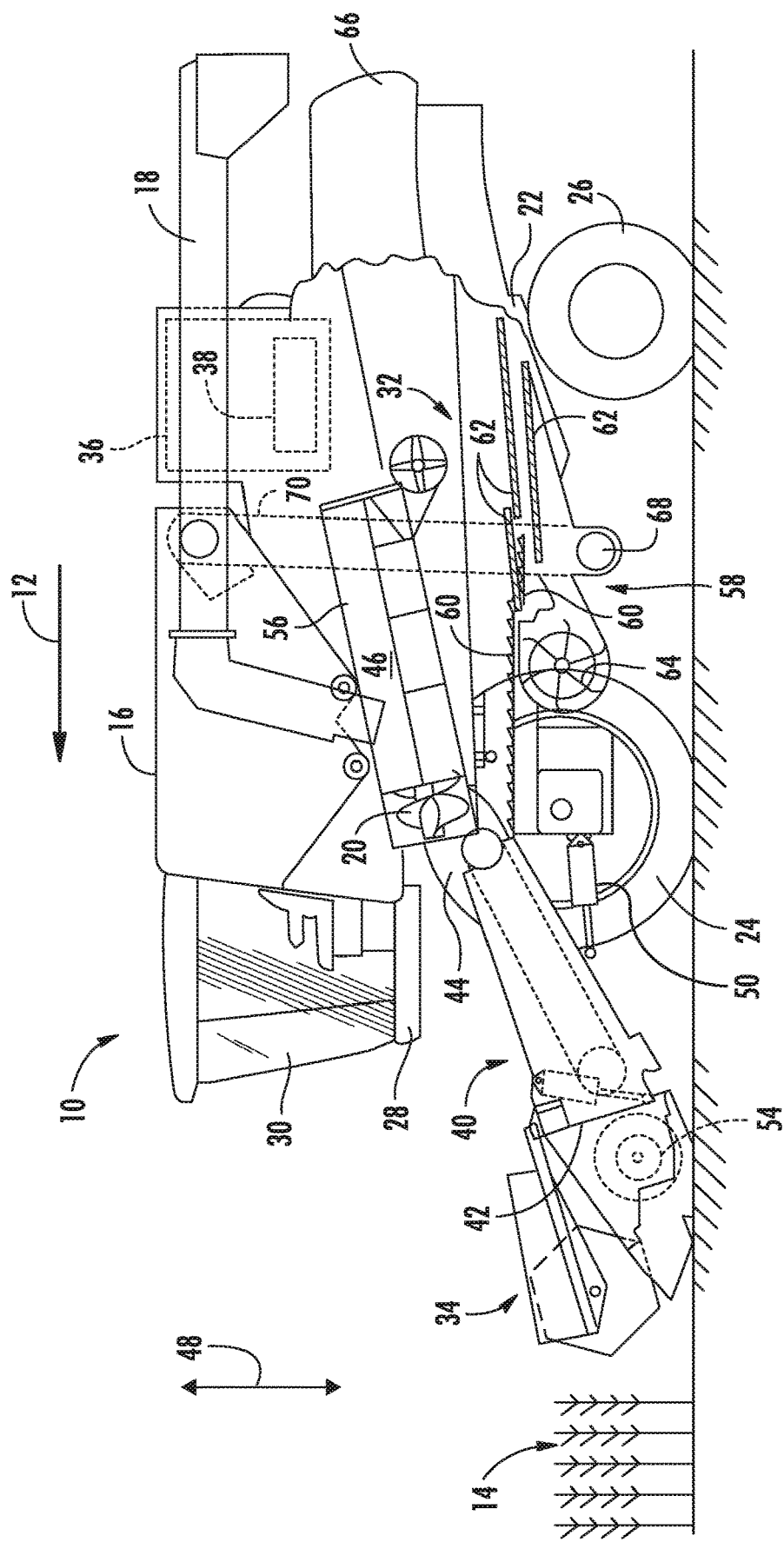
FIG. 1 illustrates a partial sectional side view of one embodiment of an agricultural harvester in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for adjusting the orientation of a harvesting implement of an agricultural harvester. Specifically, in several embodiments, a controller of the disclosed system may be configured to receive an input associated with a predetermined characteristic of the harvesting implement, such as the manufacturer, model, and/or type of the implement. In one embodiment, the controller may be configured to receive the input from the operator of the harvester (e.g., via a user interface of the harvester). Alternatively, the controller may be configured to receive the input from the harvesting implement, such as via an electrical connector (e.g., based on the number of connected pins) or a radio frequency identification (RFID) tag of the implement. Furthermore, the controller may be configured to monitor the height of the harvesting implement (i.e., the distance between the harvesting implement and the field surface) based on data received from a suitable sensor. Thereafter, the controller may be configured to initiate adjustments of a fore/aft tilt angle of the harvesting implement based on the received predetermined characteristic(s) and the monitored distance. For example, as the harvesting implement is raised and lowered between maximum and minimum operational heights relative to the ground, the controller may be configured to control the operation of one or more actuators of the harvester to adjust the fore/aft tilt angle in a manner the optimizes the efficiency of the harvesting operation.

Referring now to the drawings, FIG. 1 illustrates a partial sectional side view of the agricultural harvester 10. In general, the harvester 10 may be configured to travel across a field in a forward direction of travel (e.g., as indicated by arrow 12) to harvest a crop 14. While traversing the field, the harvester 10 may be configured to process and store the harvested crop within a crop tank 16 of the harvester 10. Furthermore, the harvested crop may be unloaded from the crop tank 16 for receipt by the crop receiving vehicle (not shown) via a crop discharge tube 18 of the harvester 10.

As shown, in one embodiment, the harvester 10 may be configured as an axial-flow type combine in which the harvested crop is threshed and separated while being advanced by and along a longitudinally arranged rotor 20. However, it should be appreciated that, in alternative embodiments, the harvester 10 may have any other suitable harvester configuration, such as a traverse-flow type configuration.

The harvester 10 may include a chassis or main frame 22 configured to support and/or couple to various components of the harvester 10. For example, in several embodiments, the harvester 10 may include a pair of driven, ground-engaging front wheels 24 and a pair of steerable rear wheels 26 that are coupled to the frame 22. As such, the wheels 24, 26 may be configured to support the harvester 10 relative to the ground and move the harvester 10 in the forward direction of travel 12. Furthermore, the harvester 10 may include an operator's platform 28 having an operator's cab 30, a crop processing system 32, the crop tank 16, and the crop discharge tube 18 that are supported by the frame 22. As will be described below, the crop processing system 32 may be configured to perform various processing operations on the harvested crop as the crop processing system 32 operates to transfer the harvested crop between a harvesting implement of the harvester 10, such as a header 34, and the crop tank 16. Furthermore, the harvester 10 may include an engine 36 and a transmission 38 mounted on the frame 22. The transmission 38 may be operably coupled to the engine 36 and may provide variably adjusted gear ratios for transferring engine power to the wheels 24 via a drive axle assembly (or via axles if multiple drive axles are employed).

Moreover, as shown in FIG. 1, the header 34 and an associated feeder 40 of the crop processing system 32 may extend forward of the frame 22 and may be pivotally secured thereto for generally vertical movement. In general, the feeder 40 may be configured to serve as support structure for the header 34. As shown in FIG. 1, the feeder 40 may extend between a front end 42 coupled to the header 34 and a rear end 44 positioned adjacent to a threshing and separating assembly 46 of the crop processing system 32. As is generally understood, the rear end 44 of the feeder 40 may be pivotally coupled to a portion of the harvester 10 to allow the front end 42 of the feeder 40 and, thus, the header 34 to be moved upward and downward along a vertical direction (e.g., as indicated by arrow 48 in FIG. 1) relative to the field surface to set the desired harvesting or cutting height for the header 34. For example, as shown, in one embodiment, the harvester 10 may include a height actuator 50 configured to adjust the height of the header 34 relative to the ground. As such, the height actuator 50 may correspond to a fluid-driven actuator, such as a hydraulic or pneumatic cylinder, an electric linear actuator, or any other type of suitable actuator.

As the harvester 10 is propelled forwardly over the field with the crop 14, the crop material is severed from the stubble by one or more knives (not shown) at the front of the header 34 and delivered by a header auger 54 to the front end 42 of the feeder 40, which supplies the harvested crop to the threshing and separating assembly 46. In general, the threshing and separating assembly 46 may include a cylindrical chamber 56 in which the rotor 20 is rotated to thresh and separate the harvested crop received therein. That is, the harvested crop is rubbed and beaten between the rotor 20 and the inner surfaces of the chamber 56, whereby the grain, seed, or the like, is loosened and separated from the straw.

The harvested crop that has been separated by the threshing and separating assembly 46 may fall onto a crop cleaning assembly 58 of the crop processing system 34. In general, the crop cleaning assembly 58 may include a series of pans 60 and associated sieves 62. As is generally understood, the separated harvested crop may be spread out via oscillation of the pans 60 and/or sieves 62 and may eventually fall through apertures defined in the sieves 62. Additionally, a cleaning fan 64 may be positioned adjacent to one or more of the sieves 62 to provide an air flow through the sieves 62 that remove chaff and other impurities from the harvested crop. For instance, the fan 64 may blow the impurities off of the harvested crop for discharge from the harvester 10 through the outlet of a straw hood 66 positioned at the back end of the harvester 10. The cleaned harvested crop passing through the sieves 62 may then fall into a trough of an auger 68, which may be configured to transfer the harvested crop to an elevator 70 for delivery to the crop tank 16.

Figure 2:
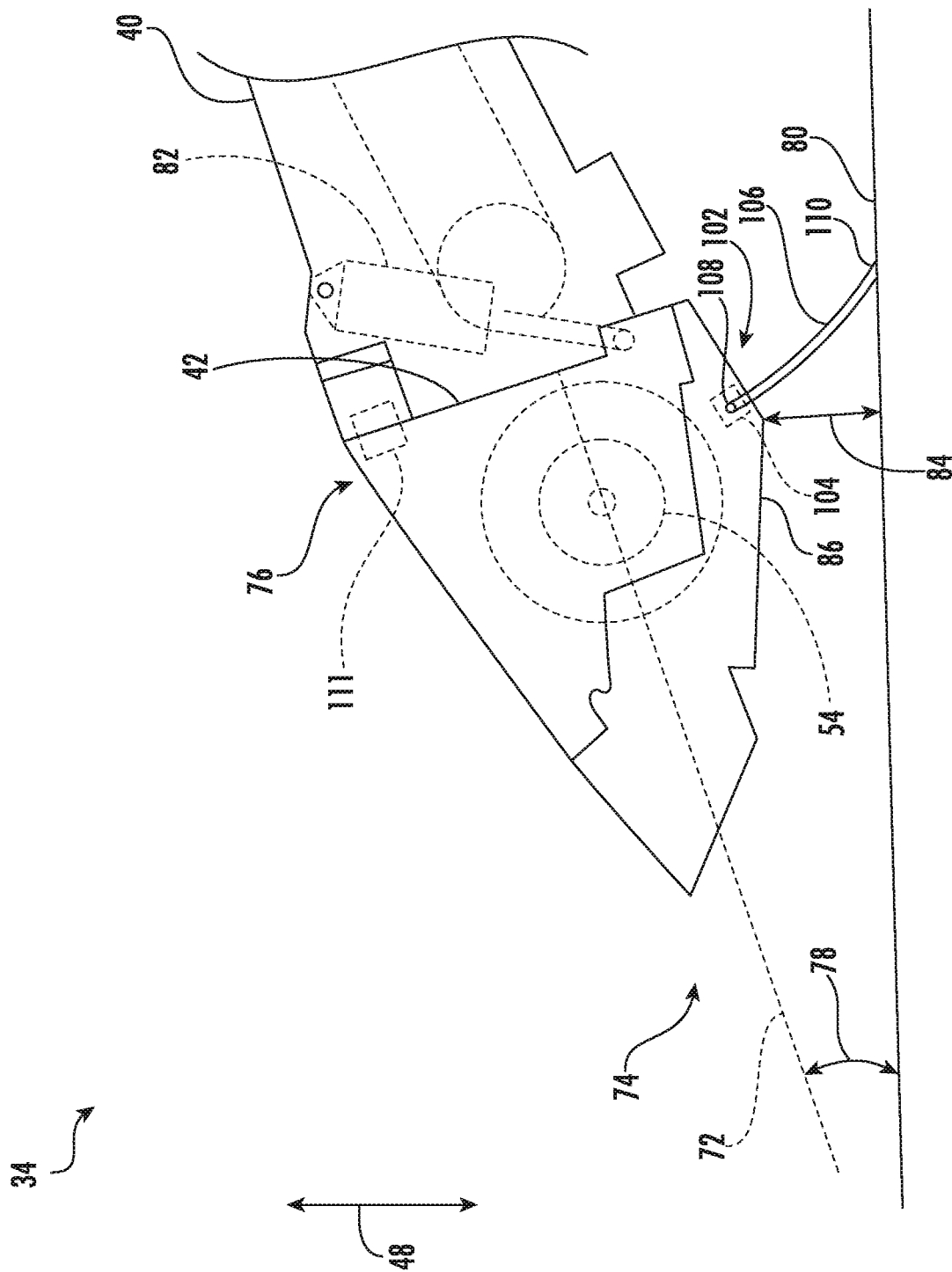
FIG. 2 illustrates a side view of one embodiment of a harvesting implement of an agricultural harvester in accordance with aspects of the present subject matter.

Referring now to FIG. 2, a side view of one embodiment of the header 34 is illustrated in accordance with aspects of the present subject matter. As shown, the header 34 may define a longitudinal axis (e.g., as indicated dashed line 72 in FIG. 2) extending between a forward end 74 of the header 34 and a rear end 76 of the header 34. Furthermore, the rear end 76 of the header 34 may be pivotally coupled to the forward end 42 of the feeder 40 to allow a fore/aft tilt angle (e.g., as indicated by arrow 78 in FIG. 2) of the header 34 to be adjusted. As used herein, the "fore/aft tilt angle" is the angle defined between the longitudinal axis 72 of the header 34 and the field surface (e.g., as indicated by line 80 in FIG. 2). As such, in one embodiment, the harvester 10 may include a tilt actuator 82 configured to adjust the fore/aft tilt angle 78 of the header 34 by pivoting the header 34 relative to the feeder 40. For example, the tilt actuator 82 may correspond to a fluid-driven actuator, such as a hydraulic or pneumatic cylinder, an electric linear actuator, or any other type of suitable actuator.

Furthermore, a height sensor 102 may be provided in operative association with the header 34. As indicated above, the header 34 may be moved upward and downward along the vertical direction 48 relative to the field surface 80 to set the desired harvesting or cutting height. In several embodiments, the height sensor 102 may be configured to detect a parameter indicative of the distance (e.g., as indicated by arrow 84 in FIG. 2) between the header 34 (e.g., a bottom 86 of the header 34) and the field surface 80. In one embodiment, the height sensor 102 may be configured as a contact-based sensor. For example, in such embodiment, the height sensor 102 include a rotary sensor 104 (e.g., a rotary potentiometer or a magnetic rotary sensor) coupled to the header 34 and a sensor arm 106 having a first end 108 pivotally coupled to the rotary sensor 104 and an opposed second end 110 configured to engage the field surface 80. As such, when the height 84 of the header 34 is adjusted, the sensor arm 106 may pivot relative to the rotary sensor 104. The rotary sensor 104 may, in turn, detect the pivotal motion of the sensor arm 106, with such pivotal movement being indicative of the header height. However, in alternative embodiments, the height sensor 102 may correspond to any other suitable sensor or sensing device configured to detect the height 84 of the header 34 relative to the field surface 80. For instance, the height sensor 102 may correspond to a non-contact-based sensor, such as an ultrasonic sensor, a RADAR-based sensor, or a proximity sensor.

Additionally, a fore/aft tilt angle sensor 111 may be provided in operative association with the header 34. Specifically, in several embodiments, the angle sensor 111 may be configured to detect a parameter indicative of the fore/aft tilt angle 78 defined between the longitudinal axis 72 of the header 34 and the field surface 80. For example, in one embodiment, the height sensor 102 may be configured as a rotary sensor, such as a rotary potentiometer or a magnetic rotary sensor. However, in alternative embodiments, the angle sensor 111 may be configured as any other suitable sensor or sensing device configured to detect the fore/aft tilt angle 78 of the header 34.

It should be further be appreciated that the configuration of the agricultural harvester 10 described above and shown in FIGS. 1 and 2 is provided only to place the present subject matter in an exemplary field of use. Thus, it should be appreciated that the present subject matter may be readily adaptable to any manner of harvester configuration.

Figure 3:
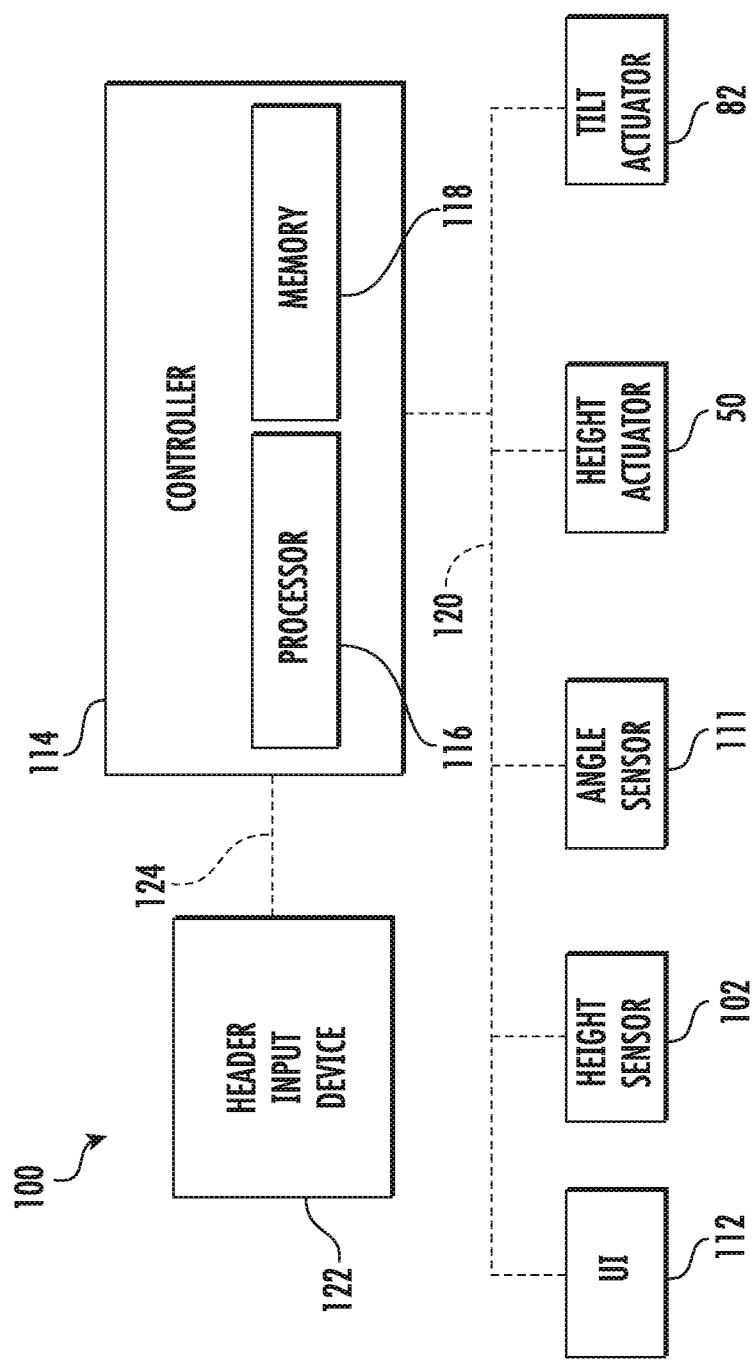
FIG. 3 illustrates a schematic view of one embodiment of a system for adjusting the orientation of a harvesting implement of an agricultural harvester in accordance with aspects of the present subject matter.

Referring now to FIG. 3, a perspective view of one embodiment of a system 100 for adjusting an orientation of a harvesting implement of an agricultural harvester is illustrated in accordance with aspects of the present subject matter. In general, the system 100 will be described herein with reference to the agricultural harvester 10 described above with reference to FIGS. 1 and 2. However, it should be appreciated by those of ordinary skill in the art that the disclosed system 100 may generally be utilized with agricultural harvesters having any other suitable harvester configuration.

As shown in FIG. 3, the system 100 may also include a user interface 112. More specifically, the user interface 112 may be configured to receive one or more inputs from the operator of the harvester 10. As such, the user interface 112 may include one or more input devices (not shown), such as touchscreens, keypads, touchpads, knobs, buttons, sliders, switches, mice, microphones, and/or the like, which are configured to receive user inputs from the operator. In addition, some embodiments of the user interface 112 may include one or more feedback devices (not shown), such as display screens, speakers, warning lights, and/or the like, which are configured to communicate feedback from the system 100 to the harvester 10. In one embodiment, the user interface 112 may be positioned within the operator's cab 30 of the harvester 10. However, in alternative embodiments, the user interface 112 may have any suitable configuration and/or be positioned in any other suitable location.

In accordance with aspects of the present subject matter, the system 100 may include a controller 114 positioned on and/or within or otherwise associated with the harvester 10. In general, the controller 114 may comprise any suitable processor-based device known in the art, such as a computing device or any suitable combination of computing devices. Thus, in several embodiments, the controller 114 may include one or more processor(s) 116 and associated memory device(s) 118 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 118 of the controller 114 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 118 may generally be configured to store suitable computer-readable instructions that, when implemented by the processor(s) 116, configure the controller 114 to perform various computer-implemented functions.

In addition, the controller 114 may also include various other suitable components, such as a communications circuit or module, a network interface, one or more input/output channels, a data/control bus and/or the like, to allow controller 114 to be communicatively coupled to any of the various other system components described herein (e.g., the height actuator 50, the tilt actuator 82, the height sensor 102, and/or the user interface 112). For instance, as shown in FIG. 3, a communicative link or interface 120 (e.g., a data bus) may be provided between the controller 114 and the components 50, 82, 102, 112 to allow the controller 114 to communicate with such components 50, 82, 102, 112 via any suitable communications protocol (e.g., CANBUS).

Furthermore, in one embodiment, the system 100 may include a header input device 122 installed on or otherwise provided in association with the header 34. Specifically, in several embodiments, the header input device 122 may be configured to provide an input associated with one or predetermined characteristics of the header 34. As used herein, the predetermined characteristic(s) may be any suitable predetermined characteristic(s) or parameter(s) of the header 34 upon which adjustments to the fore/aft tilt angle 78 may be based. For example, such predetermined characteristics may include the manufacturer of the header 34, the model of the header 34, the type of the header 34 (e.g., maize/corn header, grain header, draper header, pick-up header, etc.), and/or the like. Additionally, as will be described below, in some embodiments, the controller 114 may be configured to receive the input associated with the predetermined characteristic(s) of the header 34 from the operator (e.g., via the user interface 112) in addition to or in lieu the header input device 122.

It should be appreciated that the header input device 122 may be any suitable device that, when communicatively coupled to the controller 114 (e.g., by a communicative link or interface 124), provides an input associated with one or predetermined characteristics of the header 34. For example, in one embodiment, the header input device 122 may correspond to an electrical connector of the header 34 having one or more pins, with the number and/or configuration of pins being indicative of the predetermined characteristic(s). In such embodiment, when the header connector mates with or otherwise engages a corresponding connector (not shown) on the harvester 10 that is communicatively coupled to the controller 114, the controller 114 may be configured to determine the predetermined characteristic(s) based on the number and/or configuration of pins of the header connector that are received by the harvester connector. In another embodiment, the header input device 122 may be configured as a radio frequency identification (RFID) tag installed or otherwise positioned on the header 34, with the predetermined characteristic(s) stored on the RFID tag. In such embodiment, when the header 34 is coupled to the feeder 40, the RFID tag may be positioned adjacent an associated RFID reader (not shown) on the feeder 40. The RFID reader may, in turn, "read" the RFID tag on the header 34 and transmit the stored predetermined characteristic(s) to the controller 114. However, in alternative embodiments, the header input device 122 may have any other suitable configuration. Additionally, in a further embodiment, the header input device 122 may be configured as a controller of the header 34 that is separate from the controller 114. In such embodiment, when the header controller is communicatively coupled to the controller 114 (e.g., via the communicative link 124), the header controller may be configured to transmit data associated with the predetermined characteristic(s) to the controller 114. In general, the header controller may comprise any suitable processor-based device known in the art, such as a computing device or any suitable combination of computing devices. Thus, the header controller may include one or more processor(s) and associated memory device(s) configured to perform a variety of computer-implemented functions. Such memory device(s) may generally be configured to store suitable computer-readable instructions that, when implemented by the processor(s), configure the header controller to perform various computer-implemented functions, such as transmitting data associated with the predetermined characteristic(s to the controller 114.

In several embodiments, the controller 114 may be configured to receive an input associated with one or more predetermined characteristics of the header 34, such as the manufacturer, model, and/or type of the header 34. For example, in one embodiment, the controller 114 may be configured to receive the input from the operator. In such embodiment, the operator of the harvester 10 may provide the predetermined characteristic(s) into the user interface 112, such as via the one or more input devices. The predetermined characteristic(s) may, in turn, be transmitted to the controller 114 via the communicative link 120. Alternatively, the controller 114 may be configured to receive the input from the header input device 122. As mentioned above, in one embodiment, the header input device 122 may be configured as an electrical connector of the header 34. In such embodiment, when installing or otherwise coupling the header 34 to the feeder 40 of the harvester 10, the operator may connect the header electrical connector to a corresponding electrical connector on the harvester 10. As such, the controller 114 may determine the predetermined characteristic(s) based on the number and/or configuration of pins of the header electrical connector. Furthermore, as mentioned above, in another embodiment, the header input device 122 to may be configured as an RFID tag. In such embodiment, an associated RFID reader may "read" the RFID tag to determine the predetermined characteristic(s). The predetermined characteristic(s) may, in turn, be transmitted to the controller 114 via the communicative link 122. Additionally, as mentioned above, the header input device 122 may be configured as a separate controller of the header 34. In such embodiment, the header controller may be communicatively coupled to the controller 114 (e.g., via the communicative link 124) such that the predetermined characteristic(s) may, in turn, be transmitted from the header controller to the controller 114. However, it should be appreciated that the controller may be configured to receive the input associated with the predetermined characteristic(s) to any other suitable manner.

Furthermore, in several embodiments, the controller 114 may be configured to access a header orientation data set based on the received predetermined characteristic(s) of the header 34. In general, the header orientation data set may, for one or more given operational heights or positions of the header 34, provide a corresponding fore/aft tilt angle of the header 34. As indicated above, the optimal or desired fore/aft tilt angle of the header 34 varies based on the manufacturer, model, type, and/or other predetermined characteristics of the header 34 in addition to the height of the header 34 (e.g., the distance 84 between the header 34 and the field surface 80). As such, in one embodiment, various header orientation data sets may be stored in the memory 118 of the controller 114, with each data set corresponding to a particular manufacturer, model, type, or combination thereof. In this regard, upon receipt of the predetermined characteristic(s) of the header 34, the controller 114 may be configured to retrieve or otherwise access the appropriate header orientation data set stored within its memory 118 for use during a harvesting operation. However, in alternative embodiments, the appropriate header orientation data set may be stored within a memory device (not shown) of the header input device 122 (e.g., within an RFID tag). In such embodiments, the appropriate header orientation data set may be part of or incorporated with the predetermined characteristic(s) received from the header input device 122.

Additionally, the controller 114 may be configured to access the header orientation data set based on one or more field conditions. More specifically, in several embodiments, a plurality of harvester orientation data sets for each manufacturer, model, type, or combination thereof may be stored within the memory 118 of the controller 114, with each data set corresponding to a particular field condition, such as moisture content. For example, in one embodiment, a first header orientation data set for dry field conditions and a second header orientation data set for wet field conditions may be stored in the memory 118 for each manufacturer, model, type, or combination thereof. In such embodiment, the controller 114 may be configured to receive an input indicative of the moisture content of the field, such as from the user interface 112 or a moisture sensor (not shown). Thereafter, the controller 114 may be configured to retrieve or otherwise access the appropriate or orientation data set stored within its memory 118 for use during a harvesting operation based on the received predetermined characteristic(s) and soil moisture inputs. However, in alternative embodiments, the field condition(s) may correspond to any other suitable field condition, such as soil type, trash content, weed coverage, and/or the like.

It should be appreciated that each header orientation data set may correspond to any suitable data structure. In several embodiments, each header orientation data set may be configured as a suitable look-up table. For example, each look-up table may include a first column containing a minimum predetermined operational header height, a maximum predetermined operational header height, and one or more intermediate header heights between the minimum and maximum predetermined operational header heights. In general, the minimum and maximum operational heights may correspond to the minimum and maximum distances 84 between the header 34 and the field surface 80 at which the header 34 may be configured to cut and ingest the crop 14, respectively. Furthermore, each look-up table may include a second column containing a plurality of fore/aft tilt angles, with each fore/aft tilt angle corresponding to one of the header heights. However, in alternative embodiments, each header orientation data set may correspond to a graph, chart, map, and/or any other suitable type of data structure.

In certain instances, the operator may wish to set different minimum and/or maximum operational header heights than the predetermined minimum and/or maximum operational header heights of the accessed header orientation data sets. As such, in one embodiment, the operator may provide desired minimum and/or maximum operational header heights to the user interface 112, such as via the one or more input devices. The desired minimum and/or maximum operational header heights may, in turn, be transmitted to the controller 114 via the communicative link 120. Upon receipt of the desired minimum and/or maximum operational header heights, the controller 114 may be configured to update or modify the accessed header orientation data set. For example, when the desired minimum height is greater than the predetermined minimum height and/or the desired maximum height is less than predetermined maximum height, the controller 114 may be configured to ignore the portions of the data set less than the desired minimum heights and/or greater than the desired maximum heights. Conversely, when the desired minimum height is less than the predetermined minimum height and/or the desired maximum height is greater than predetermined maximum height, the controller 114 may be configured to determine fore/aft tilt angles corresponding to the desired minimum and/or maximum heights. Additionally, in such instances, the controller 114 may be configured to determine the fore/aft tilt angles for additional header heights between the desired and predetermined minimum heights and/or between the desired and predetermined maximum heights. For example, the controller 114 may include one or more suitable algorithms stored within its memory 118 that, when executed, configure the controller 114 to determine the additional header heights and the corresponding fore/aft tilt angles.

In several embodiments, the controller 114 may be configured to control the height of the header 34 based on an input received from the operator. As indicated above, the operator of the harvester 10 may adjust the height of the header 34 (i.e., the distance 84 between the header 34 and the field surface 80) during a harvesting operation based on field conditions. For example, when the harvester 10 encounters down or fallen crops, the operator typically lowers the height of the header 34 to improve harvesting efficiency. Conversely when the harvester 10 encounters standing crops, the operator typically raises the height of the header 34 to reduce the amount of the field trash ingested by the harvester 10. In this regard, as the harvester 10 is traveling across the field while performing a harvesting operation, the operator may provide an input to raise and/or lower the header 34 to the user interface 112, such as via the one or more input devices. The raise/lower input may, in turn, be transmitted to the controller 114 via the communicative link 120. Thereafter, the controller 114 may be configured to control the operation of the height actuator 50 (e.g., by extending and/or retracting a rod of the actuator 50) such that the header 34 such that the header 34 is raised and/or lowered.

Moreover, in several embodiments, the controller 114 may be configured to monitor the height of the header 34 relative to the field surface 80. Specifically, as the harvester 10 is moved across the field to perform a harvesting operation, the controller 114 may be configured to receive the sensor data from the height sensor 102 (e.g., via the communicative link 120). Thereafter, the controller 114 may be configured to process/analyze the sensor data to determine or estimate the distance 84 between the header 34 and the field surface 80 (i.e., the height of the header 34). For instance, the controller 114 may include a look-up table(s), suitable mathematical formula, and/or algorithms stored within its memory 118 that correlates the received sensor data to the distance 84.

Furthermore, in several embodiments, the controller 114 may be configured to monitor the fore/aft tilt angle of the header 34 relative to the field surface 80. Specifically, as the harvester 10 is moved across the field to perform a harvesting operation, the controller 114 may be configured to receive the sensor data from the angle sensor 111 (e.g., via the communicative link 120). Thereafter, the controller 114 may be configured to process/analyze the sensor data to determine or estimate the fore/aft tilt angle 78 defined between the longitudinal axis 72 of the header 34 and the field surface 80. For instance, the controller 114 may include a look-up table(s), suitable mathematical formula, and/or algorithms stored within its memory 118 that correlates the received sensor data to the fore/aft tilt angle 78.

In accordance with aspects of the present subject matter, the controller 114 may be configured to automatically initiate adjustments of the fore/aft tilt angle of the header 34. As indicated above, the controller 114 may be configured to monitor the height and/or fore/aft tilt angle of the header 34 during the harvesting operation. In this regard, as the harvester 10 travels across the field, the controller 114 may be configured to determine a desired fore/aft tilt angle for the header 34 based on the monitored header height. For instance, in one embodiment, the controller 114 may be configured to retrieve the fore/aft tilt angle from the accessed header orientation data set that corresponds to the monitored height of the header 34. Thereafter, when the monitored fore/aft tilt angle differs from the desired fore/aft tilt angle (thereby indicating that the monitored fore/aft tilt angle is too high or too low), the controller 114 may be configured to control the operation of the tilt actuator 82 in a manner that adjusts the fore/aft tilt angle of the header 34

(e.g., by extending and/or retracting a rod of the actuator 82) such that the monitored fore/aft tilt angle corresponds to a desired fore/aft tilt angle.

Figure 4:
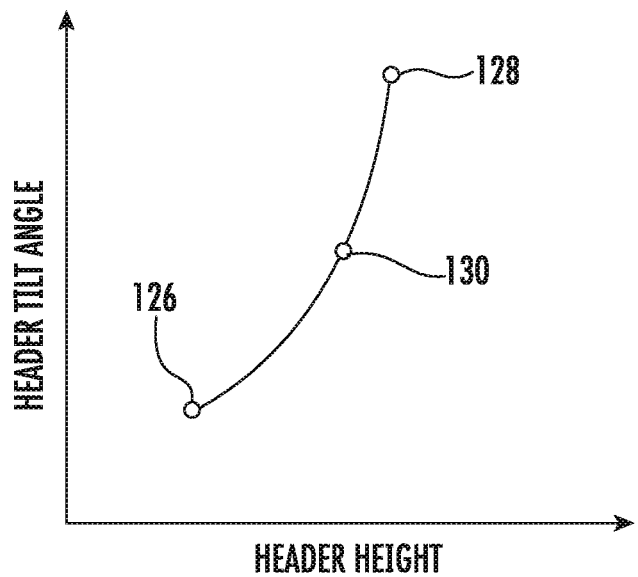
FIG. 4 illustrates a graphical view of an example header orientation data set charting the fore/aft tilt angle of a harvesting implement of an agricultural harvester based on the height of the harvesting implement in accordance with aspects of the present subject matter.

FIG. 4 illustrates a graphical view of an example header orientation data set charting the fore/aft tilt angle of the header 34 based on the height of the header 34. As shown, the data set includes a first header position (e.g., as indicated by data point 126 in FIG. 4) corresponding to a minimum header height and a minimum fore/aft tilt angle. Furthermore, the data set includes a second header position (e.g., as indicated by data point 128 in FIG. 4) corresponding to a maximum header height and a maximum fore/aft tilt angle. In this regard, as the header 34 is moved from a given header position (e.g., as indicated by data point 130 in FIG. 4) toward the first header position 126 (i.e., the header 34 is lowered), the controller 114 may be configured to control the operation of the tilt actuator 82 in a manner that decreases the fore/aft tilt angle of the header 34. Conversely, as the header 34 is moved from the given header position 130 toward the second header position 128 (i.e., the header is raised), the controller 114 may be configured to control the operation of the tilt actuator 82 in a manner that increases the fore/aft tilt angle of the header 34. However, in alternative embodiments, the fore/aft tilt angle may be increased as the header is lowered and decreased as the header is raised.

It should be appreciated that, when the controller 114 is configured to initiate adjustments of the fore/aft tilt angle of the header 34 based on the monitored header height, it may be desirable for the controller 114 to apply certain thresholds or control rules when initiating such adjustments. For instance, when the change in fore/aft tilt angle of the header 34 (e.g., the difference between the desired fore/aft tilt angle and the monitored fore/aft tilt angle) is below a predetermined threshold, the controller 114 may be configured to not make any adjustments. Similarly, if the change in height of the header 34 (e.g., the difference between subsequent header height measurements) is below a predetermined threshold, the controller 114 may be configured to not make any adjustments.

Figure 5:
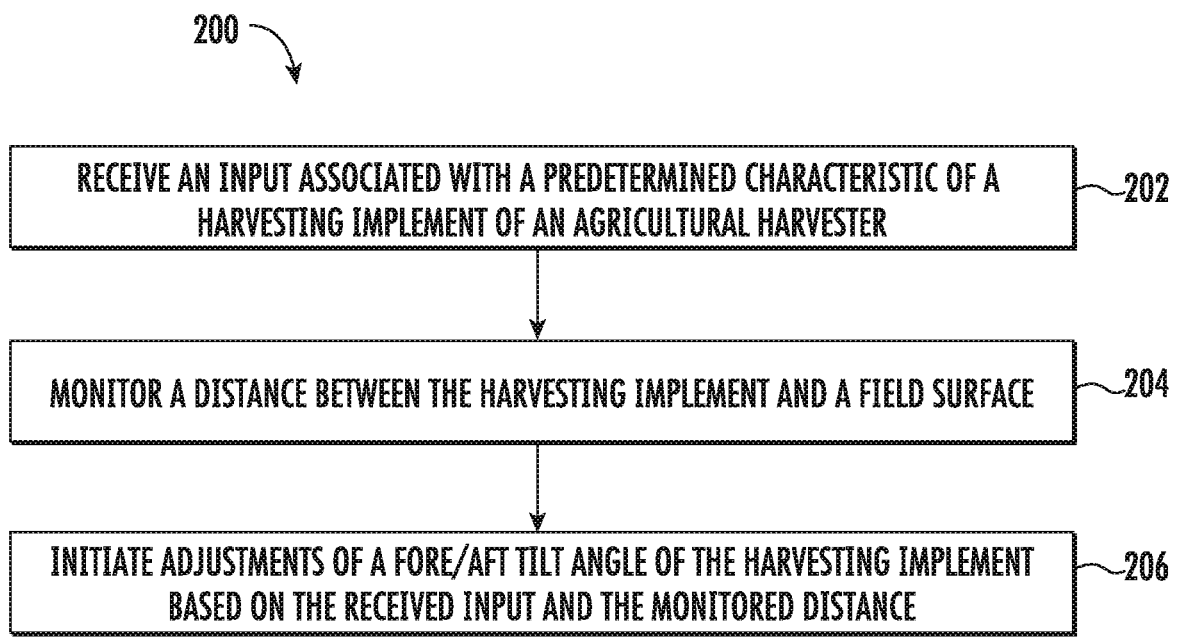
FIG. 5 illustrates a flow diagram of one embodiment of a method for adjusting the orientation of a harvesting implement of an agricultural harvester in accordance with aspects of the present subject matter.

Referring now to FIG. 5, a flow diagram of one embodiment of a method 200 for adjusting an orientation of a harvesting implement of an agricultural harvester is illustrated in accordance with aspects of the present subject matter. In general, the method 200 will be described herein with reference to the agricultural harvester 10 and the system 100 described above with reference to FIGS. 1-4. However, it should be appreciated by those of ordinary skill in the art that the disclosed method 200 may generally be implemented by any agricultural harvester having any other suitable harvester configuration and/or any system having any other suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include receiving, with a computing device, an input associated with a predetermined characteristic of a harvesting implement of an agricultural harvester. For instance, as described above, the controller 114 may be configured to receive an input associated with one or more predetermined characteristics of the header 34, such as the manufacturer, model, and/or type of the header 34, from a user interface 112 and/or a header input device 122.

Additionally, at (204), the method 200 may include monitoring, with the computing device, a distance between the harvesting implement and a field surface. For instance, as described above, the controller 114 may be communicatively coupled to the height sensor 102 via the communicative link 120. As such, when the harvester 10 travels across the field, the controller 114 may be configured to receive sensor data from the height sensor 102. Thereafter, the controller 114 may be configured to determine or estimate height of the header 34 based on the received sensor data.

Moreover, as shown in FIG. 5, at (206), the method 200 may include initiating, with the computing device, adjustments of a fore/aft tilt angle of the harvesting implement based on the received input and the monitored distance. For instance, as described above, the controller 114 may be communicatively coupled to the tilt actuator 82 via the communicative link 120. As such, the controller 114 may be configured to initiate adjustments of a fore/aft tilt angle of the header 34 by controlling the operation of the tilt actuator 82 based on the received input and the monitored distance.

It is to be understood that the steps of the method 200 are performed by the controller 114 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 114 described herein, such as the method 200, is implemented in software code or instructions which are tangibly stored on a tangible computer readable medium. The controller 114 loads the software code or instructions via a direct interface with the computer readable medium or via a wired and/or wireless network. Upon loading and executing such software code or instructions by the controller 114, the controller 114 may perform any of the functionality of the controller 114 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for adjusting a harvesting implement orientation of an agricultural harvester, the system comprising:
a harvesting implement defining a longitudinal axis extending between a forward end of the harvesting implement and an aft end of the harvesting implement, the harvesting implement configured to be coupled to the agricultural harvester in a manner that permits a fore/aft tilt angle, defined between the longitudinal axis of the harvesting implement and a field surface, to be adjusted, the harvesting implement including an input device installed on the harvesting implement, the input device configured to provide an input associated with a predetermined characteristic of the harvesting implement;
a sensor configured to detect a parameter indicative of a distance between the harvesting implement and the field surface; and
a controller communicatively coupled to the sensor, the controller configured to:
receive the input associated with the predetermined characteristic of the harvesting implement from the input device installed on the harvesting implement;
monitor the distance between the harvesting implement and the field surface based on data received from the sensor; and
initiate adjustments of the fore/aft tilt angle of the harvesting implement based on both the predetermined characteristic of the harvesting implement and the monitored distance between the harvesting implement and the field surface.

2. The system of claim 1, wherein the controller is further configured to determine a first position of the harvesting implement at which a maximum operational distance is defined between the harvesting implement and the field surface and a second position of the harvesting implement at which a minimum operational distance is defined between the harvesting implement and the field surface based on the received input.

3. The system of claim 2, wherein the controller is configured to initiate adjustments of the fore/aft tilt angle such that the fore/aft tilt angle is decreased as the harvesting implement is moved from the first position to the second position.

4. The system of claim 2, wherein the controller is configured to initiate adjustments of the fore/aft tilt angle such that the fore/aft tilt angle is increased as the harvesting implement is moved from the second position to the first position.

5. The system of claim 1, wherein the received input corresponds to a first input, the controller further configured to:
receive a second input from an operator of the agricultural harvester, the second input being indicative of a first position of the harvesting implement at which a maximum operational distance is defined between the harvesting implement and the field surface and a second position of the harvesting implement at which a minimum operational distance is defined between the harvesting implement and the field surface; and
determine the fore/aft tilt angle for a given position of the harvesting implement based on the predetermined characteristic of the harvesting implement and the received second input, the given position being located between the first and second positions.

6. The system of claim 1, wherein the predetermined characteristic comprises at least one of a manufacturer, model, or type of the harvesting implement.

7. The system of claim 1, wherein the controller is configured to initiate adjustments of the fore/aft tilt angle based on a field condition in addition to the received input and the monitored distance.

8. A method for adjusting an orientation of a harvesting implement of an agricultural harvester, the harvesting implement defining a longitudinal axis extending between a forward end of the harvesting implement and an aft end of the harvesting implement, the harvesting implement configured to be coupled to the agricultural harvester in a manner that permits a fore/aft tilt angle, defined between the longitudinal axis of the harvesting implement and a field surface, to be adjusted, the harvesting implement including an input device installed on the harvesting implement, the input device configured to provide an input associated with a predetermined characteristic of the harvesting implement the method comprising:
receiving, with a computing device, the input associated with the predetermined characteristic of the harvesting implement from the input device installed on the harvesting implement;
monitoring, with the computing device, a distance between the harvesting implement and the field surface; and
initiating, with the computing device, adjustments of the fore/aft tilt angle of the harvesting implement based on both the predetermined characteristic of the harvesting implement and the monitored distance between the harvesting implement and the field surface.

9. The method of claim 8, further comprising:
determining, with the computing device, a first position of the harvesting implement at which a maximum operational distance is defined between the harvesting implement and the Meld surface and a second position of the harvesting implement at which a minimum operational distance is defined between the harvesting implement and the field surface based on the received input.

10. The method of claim 9, wherein initiating adjustments of the fore/aft tilt angle comprises initiating, with the computing device, adjustments of the fore/aft tilt angle such that the fore/aft tilt angle is decreased as the harvesting implement is moved from the first position to the second position.

11. The method of claim 9, wherein initiating adjustments of the fore/aft tilt angle comprises initiating, with the computing device, adjustments of the fore/aft tilt angle such that the fore/aft tilt angle is increased as the harvesting implement is moved from the second position to the first position.

12. The method of claim 8, wherein the received input corresponds to a first input, the method further comprising:
receiving, with the computing device, a second input from an operator of the agricultural harvester, the second input being indicative of a first position of the harvesting implement at which a maximum operational distance is defined between the harvesting implement and the field surface and a second position of the harvesting implement at which a minimum operational distance is defined between the harvesting implement and the field surface; and
determining, with the computing device, the fore/aft tilt angle for a given position of the harvesting implement based on predetermined characteristic of the harvesting implement and the received second input, the given position being located between the first and second positions.

13. The method of claim 8, wherein the predetermined characteristic comprises at least one of a manufacturer, model, or type of the harvesting implement.

14. The method of claim 8, wherein initiating adjustments of the fore/aft tilt angle comprises initiating, with the computing device, adjustments of the fore/aft tilt angle based on a field condition in addition to the received input and the monitored distance.

15. The system of claim 1, wherein, when initiating the adjustments of the fore/aft tilt angle of the harvesting implement, the controller is further configured to:
- access an orientation data set based on the predetermined characteristic of the harvesting implement; and
- retrieve a desired fore/aft tilt angle for the harvesting implement from the accessed orientation data set corresponding to the monitored distance between the harvesting implement and the field surface.

16. The method of claim 8, wherein initiating the adjustments of the fore/aft tilt angle of the harvesting implement comprises:
- accessing, with the computing device, an orientation data set based on the predetermined characteristic of the harvesting implement; and
- retrieving, with the computing device, a desired fore/aft tilt angle for the harvesting implement from the accessed orientation data set corresponding to the monitored distance between the harvesting implement and the field surface.

* * * * *